United States Patent
Barrett

[15] 3,667,396
[45] June 6, 1972

[54] SOLID PROPELLANT GRAIN IGNITER
[72] Inventor: Donald H. Barrett, Waco, Tex.
[73] Assignee: North American Rockwell Corporation
[22] Filed: Apr. 2, 1969
[21] Appl. No.: 812,935

[52] U.S. Cl..............................102/101, 102/28, 102/49.7, 102/70.2, 60/256
[51] Int. Cl..........................................................F42b 1/00
[58] Field of Search................102/49.7, 28, 46, 70.2, 100, 102/101; 60/256

[56] References Cited

UNITED STATES PATENTS

| | | | |
|---|---|---|---|
| 2,685,837 | 8/1954 | Sage et al. | 102/70.2 I |
| 2,974,596 | 3/1961 | Allen | 102/27 X |
| 3,014,425 | 12/1961 | Turnbull et al. | 102/70.2 I |
| 3,062,147 | 11/1962 | Davis et al. | 60/256 X |
| 3,104,523 | 9/1963 | O'Donnell | 60/255 |
| 3,128,600 | 4/1964 | Oldham | 60/250 |
| 3,173,370 | 3/1965 | Landry, Jr. et al. | 102/27 X |

Primary Examiner—Robert F. Stahl
Attorney—William R. Lane and Thomas S. MacDonald

[57] ABSTRACT

An igniter for a solid propellant grain having a perforated sheet substrate, which serves as a support structure for a flexible pyrotechnic coating applied to either one side or both sides of the sheet and extending into the interstices of the sheet, and an igniter cord attached to the sheet in which said cord contains a detonating-igniting composition which when initiated by a squib produces hot particles to penetrate the sheet interstices and ignite the coating.

8 Claims, 6 Drawing Figures

PATENTED JUN 6 1972 3,667,396

INVENTOR.
DONALD H. BARRETT

BY
Thomas S. MacDonald
ATTORNEY

INVENTOR.
DONALD H. BARRETT
BY Thomas E. MacDonald
ATTORNEY

SOLID PROPELLANT GRAIN IGNITER

BACKGROUND OF THE INVENTION

Of particular interest are recent developments in solid propellant rocket motors which have restart capabilities. Normally, once a solid propellant grain is initiated the whole grain burns until it is consumed. For particular missions it is desirable to have a solid propellant motor which has stop-restart capability. Such motors can fine use, for example, in Vernier control, as well as having the ability to utilize different grains for the boost ans sustain period of a mission. The restartable type of solid propellant motor may have individual grains insulated from one another such that upon the burning of one segment the remainder of the motor is not ignited. Alternatively, means may be provided for the actual quenching of a solid propellant grain once burning has started with a liquid or solid type material. Though many designs have been proposed for the multiple restart solid propellant motor, one of the inherent problems is the ability to restart the motor after it has been stopped after the initial burning. Often the design of the multiple restart motors will call for the ignition means to be disposed in various locations of the grain. The inwardly located surfaces are normally inaccessible to the common type of igniter such as a pelleted basket or a pyrogen igniter or the like such as represented by U.S. Pat. Nos. 2,956,401; 2,743,580; 3,000,312; 3,062,147 and 3,173,370. Even when a problem of inserting the igniter is not confronted, there is additionally present a segregation problem relative to preventing the hot gases due to the initial burning of the grain from reaching any additional igniters to be utilized. Protection of the conventional igniters from the high temperature combustion gases during motor firings provides extremely complex design problems. Previous attempts to overcome the disadvantages of the conventional type of igniters for utilization in restart motors have resulted in a conductive film type igniter. This previous type, however, has the disadvantage of requiring high firing currents in order to ignite it, processing problems, and inefficient application of the ignition energy. Additionally, the conductive film igniter is applied directly to a grain surface and cannot be removed or replaced without damage to the grain when this is desired.

Thus an object of this invention is to provide an igniter which can be formed to fit any grain configuration where a minimum of space and weight are required.

Another object of this invention is to provide an igniter which is made of completely consumable components.

A further object of this invention is to provide an igniter which can be removed or replaced without damage to the propellant grain.

A further object of this invention is to provide an igniter which can be fired at normal aircraft voltages.

A further object of this invention is to provide an igniter which has an extremely rapid ignition.

A further object of this invention is to provide an igniter which may be utilized for multiple restart solid propellant grains.

SUMMARY OF THE INVENTION

The igniter of this invention comprises a substrate constructed of a metal mesh wire screen which is coated preferably on one side with a pyrotechnic formulation to a desired thickness. This provides the primary source of energy for ignition of the solid propellant rocket motor in which it is utilized. The pyrotechnic coating on the screen is ignited by a fuse material which, for example, could be Pyrocore, a product of E. I. du Pont which is shown in U. S. Pat. No. 2,974,596, or Hotline, a product of Ensign-Bickford Company. This fuse is a small diameter continuous tubing, preferably of metal, containing a detonating-ignition core composition. The propagation of the fuse or igniter cord which is attached to the side of the substrate is extremely fast so that essentially instantaneous ignition of the pyrotechnic coating adjacent to the fuse occurs by reason of the movement of hot particles from the cord core composition through the interstices of the substrate. The fuse is initiated by a conventional initiator or squib which is designed for igniting the particular fuse utilized. The initiator is fired electrically by normal methods for electro-explosive devices. A number of these igniters may be utilized in a solid propellant motor corresponding to the layers of grain which are desired to be reignited so that a stop-restart motor can be achieved. The utilization of the perforated sheet substrate provides a substantial advantage over a continuous sheet of metal. Due to the porosity of the sheet, the hot gases generated by ignition of the pyrotechnic material can escape therefrom over a wide area. The igniter may be retained near the surface of a propellant grain. If a continuous sheet of material with no apertures therein is utilized, the tendency is for the sheet to be blown away from the surface of the propellant grain affecting the igniter's ability to perform its function of igniting the grain.

It is believed the invention will be better understood from the following detailed drawings in which:

FIG. 1 partially depicts a cutaway pictorial view of the igniter fitted on the end of an end-burner type solid propellant grain;

DETAILED DESCRIPTION OF INVENTION

Figure 1:
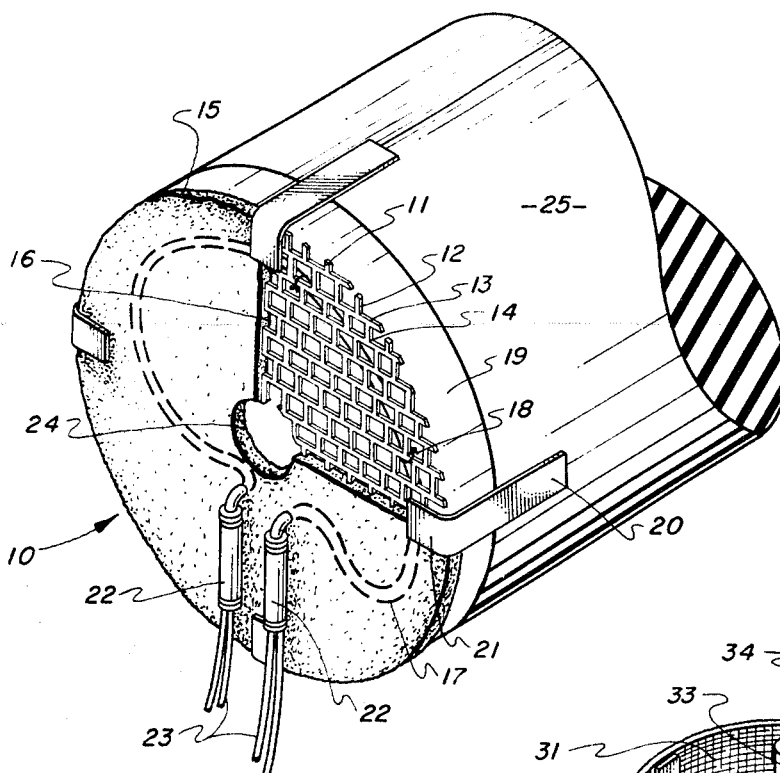

Referring now to FIG. 1, there is disclosed the basic structure 10 of the preferred embodiment of the igniter of this invention. Shown is a flat circular substrate 11 made of a metal sheet 12 which, for example, may preferably be aluminum. The sheet is made of a stamping having vertical and horizontal members 12 and 13 forming interstices or apertures 14 therein. Typically, the perforations 14 will be square on ¼ inch centers. A coating of pyrotechnic composition 15 of the order of 0.10 inches in thickness is placed on both sides of sheet 11 so that the composition adheres to the sheet and preferably extends, as at 16, into the perforations 14. An igniter cord 17 is mounted by ties 18 to the opposite side of sheet 11 typically in a sinuous pattern and has one or more of its ends connected to a squib 22. Electrical leads 23 are connected to a source of voltage and initiating switch (not shown). Four L-shaped metal supports are provided, each having a leg portion 21 attached to sheet 11 and an axially extending leg or mounting strap 20. The supports serve to position this particular configuration on the outer peripheral surface of an end-burning type solid propellant grain 25. The supports serve as a mounting or positioning means for the igniter. A cylindrical aperture 24 may be provided through the pyrotechnic coating and screen for the purpose of venting the gases from the igniter/propellant interface. A flame barrier 19 may be used to protect one stage of a rocket motor from another. It will be sized in thickness to ensure adequate insulation to maintain a sufficiently low temperature in one stage following completion of burning of the previous stage. The barrier is preferably made of a rubber-base composition such as ethylene propylene terpolymer, carbon black and organic peroxide powder in proportions such as 75.47/22.64/1.89 weight percent. The barrier will be ruptured simultaneously with the ignition of the overall ignitor since it is in contact with cord 17.

While only one single strand of cord 17 is shown in this particular example, it should be apparent, however, in larger or more complex igniters that several strands or complex patterns of fuse trains could be provided over the perforated sheet to provide a rapid and wide dispersion of heat in burning. The fuse train can be attached to the sheet by tape, adhesives or fine wires. The position and length of the igniter cord are two variables used to control the rate of energy output from the igniter to the motor propellant.

Figure 2:
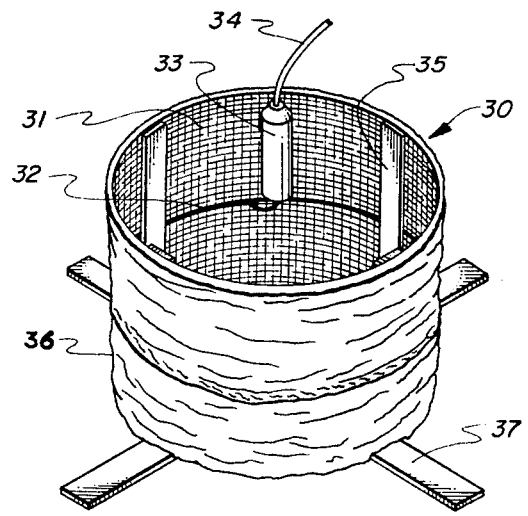
FIG. 2 is a pictorial view of a modification of the igniter particularly adapted to be fitted within a cylindrical internal cavity of an annular type solid propellant grain.

Referring now to FIG. 2 there is shown a wire screen structure 31 in cylindrical form having a coating 36 placed thereupon of a pyrotechnic composition. It is the burning of this composition that gives off the necessary heat by means of hot gases to ignite and start the main solid propellant motor. Any of a number of pyrotechnic compositions in a suitable binder material that is compatible with the wire screen may be successfully utilized. The pyrotechnic composition 36 can be applied by manual means through the use of a spatula or like apparatus to the wire screen, or dip coated, in a relatively thin coating sufficient to completely cover the screen material to the desired thickness. Generally, in the application of the material both sides of the screen are inherently coated due to the porosity of the screen, though the invention is successful when only one side is coated. The pyrotechnic coating is normally self-curing at ambient or near ambient conditions so that a finished product is then ready for use. An igniting cord or fuse train 32 is mounted on the inside periphery of the screen and is connected at least at one end to a squib or initiator 33 connected in turn by wires 34 to a switch and voltage device (not shown). L-shaped straps each have a longitudinal leg 35 which aids in supporting the wire screen and a radial leg 37 adapted to fit over the end of a cylindrical grain. The assembly 30 shown in FIG. 2 thus represents a finished igniter of one form of the invention prior to installation in a propellant grain.

Figure 3:
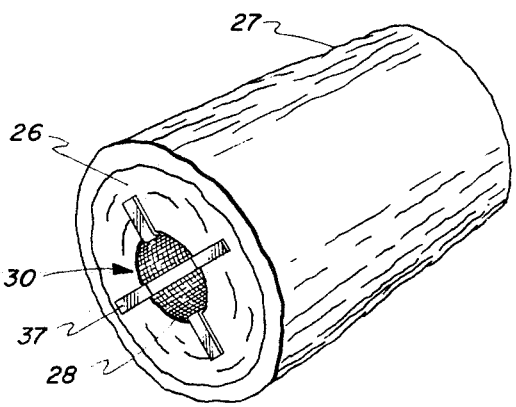
FIG. 3 is a pictorial representation of an annular solid propellant grain having the igniter of FIG. 2 inserted therein.

FIG. 3 represents the igniter of FIG. 2 disposed in a solid propellant grain ready for ignition. As can be seen, the propellant grain 26 is comprised of a solid propellant formulation having an outer restrictor layer 27. The grain has an internal perforation 28 which generally corresponds to the diameter of the igniter 30. As shown, the igniter sits within the internal perforation of the grain while the radial support struts 37 extend at the end of the grain 26 to serve to position the igniter in the motor and prevent it from slippage within the internal perforation.

It should be pointed out that the particular igniters shown in FIGS. 1–3 are only two of many possible configurations contemplated within the scope of the invention. Additionally, various other possibilities exist, all based on the underlying novel concept of the invention wherein a perforated sheet or wire screen is coated with flexible pyrotechnic material and has a fuse train therethrough providing rapid ignitability and complete consumption of the components comprising the igniter.

Figure 4:
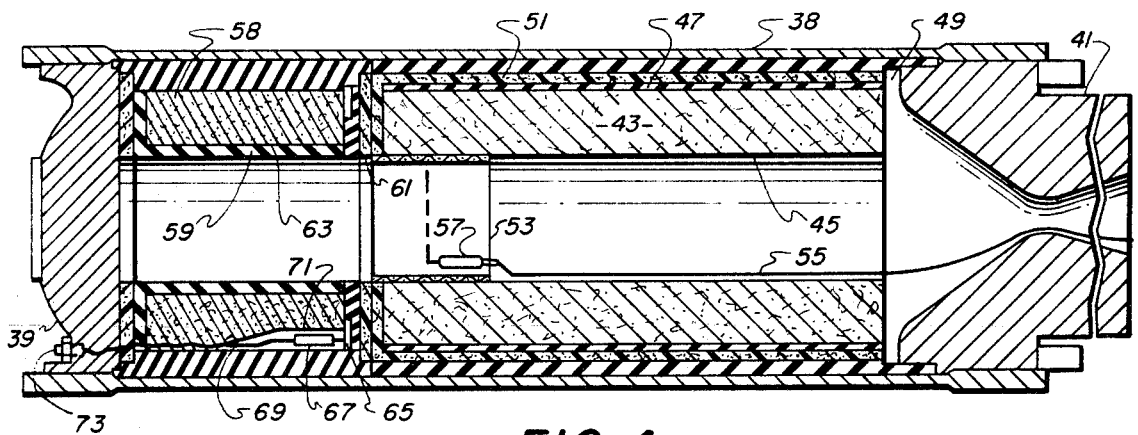
FIG. 4 is a cross-sectional view of a restartable solid propellant motor incorporating the igniters of the invention.

Shown in FIG. 4 is a typical application of the igniter concept of the invention in a restartable solid propellant motor. Disclosed is a solid propellant motor having a metal case 38 and a head end closure 39. The rear or opposite end from the head end closure is a nozzle 41. A boost or primary solid propellant grain 43 is disposed adjacent the nozzle 41 within the casing 38. The primary grain is of cylindrical configuration having an internal cylindrical perforation 45. The grain 43 has a layer of rubbery conventional restrictor material 47 surrounding the outer periphery thereof. However, as can be seen, the grain has no restrictor at the end portion 49 nor at the internal perforation 45. Thus the grain will burn both from the end and the interior once initiated. Surrounding the restrictor is a layer of a foam material 51, for example, such as polystyrene or the like which serves as a space element and can absorb any expansion in the grain. This element is not always present in motors but is shown here by way of example in this particular grain and forms no part of the invention. Between the spacer 51 and the outer case 38 is a layer of insulating material which can be comprised of a rubbery binder having filler materials such as asbestos and the like therein which serves to insulate the metal case from the hot gases and temperatures generated by the burning of the solid propellant grain. The grain 43 is essentially the same as that shown in FIG. 3 with the location of the igniter element 53 of the invention having the same configuration and placement as that shown in FIG. 2. As can be seen, the igniter 53 is seated at the forward end of the perforation 45 in the grain. The electrical leads 55 from the initiator 57 is shown traversing the length of the perforation 45 in a rearward direction and passing out through the nozzle 41 to the rear of the motor where they can then be connected to the means for the excitation thereof.

Disposed between the primary grain and the head end closure 39 is the restart or sustainer grain 58. This grain which is ignited subsequent to the burnout of the primary grain 43 is entirely surrounded by a rubbery restrictor material 59. It is separated by a spacer 61 from the primary grain, the spacer material being the same as disposed around the primary grain. Since the sustainer grain 57 is completely restricted, no burning thereof will occur due to the heat generated by the burning of the primary grain 43. As can be appreciated, upon ignition of the restart grain burning thereof will not transpire along the inner perforation 63 since this is restricted as compared to the inner periphery of the primary grain. Thus the igniter in this particular grain is of a flat circular screen configuration 65 corresponding to FIG. 1 which is disposed at the rear end of the grain. A fuse train is disposed circumferentially and medially within and between the inner and outer diameter of the igniter and covered by pyrotechnic composition as in FIG. 2. An initiator 67 to which lead wires 69 are affixed is connected to the disc igniter 65. As can be seen in this particular application a small portion of the grain 57 is cut away at 71 to provide an area for the initiator. This is but one design and the initiator could obviously be displaced entirely outside of the grain. Lead wires 69 to the initiator are affixed to a terminal 73 at the head end closure 39. To the terminal can be connected the leads from the ignition exciting device that would be utilized with the motor.

Figure 5:
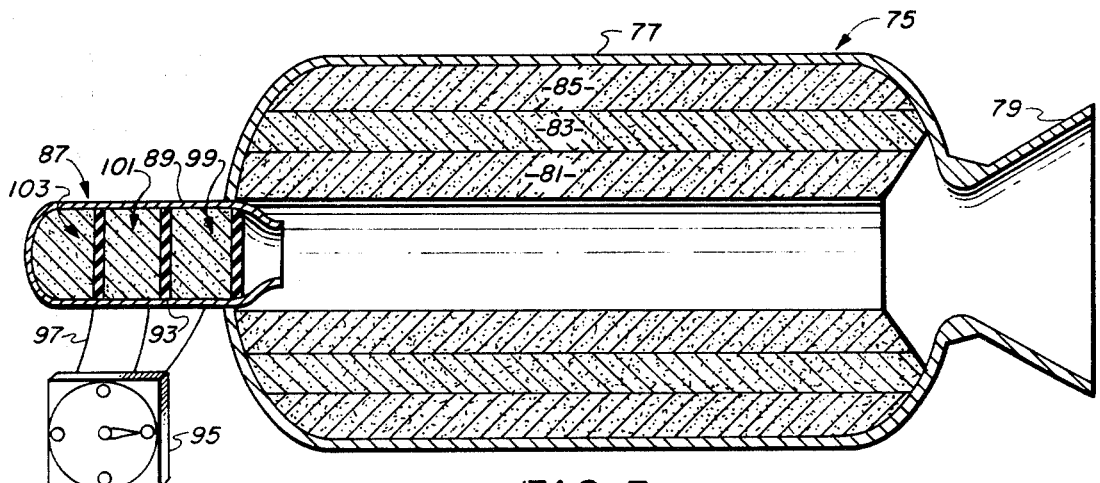
FIG. 5 is an additional embodiment of a solid propellant motor having the igniters of the invention incorporated therein.

FIG. 5 represents an additional embodiment of the invention showing utilization of an igniter concept of this invention in a multiple grain solid propellant motor. Shown is a solid propellant motor 75 having an outer case 77 thereon with a nozzle 79 at the rear of the case. As shown, the propellant is comprised of three burning layers of propellants circumferentially disposed about each other. The innermost propellant layers 81 would be the first to be ignited and burn out. The subsequent ignition would cause layer 83 and then layer 85 to burn accordingly. The burning layers are actually one entire grain. However, they have been so depicted to illustrate the reignitability feature of the invention. The burning grain can be extinguished by various techniques not shown. Extinguishment of a burning layer can occur by a sudden pressure drop in chamber pressure through the use of a variable area nozzle. Alternatively, extinguishment can occur by liquid quenching of the burning surface, for example, a quenching liquid such as water which may be sprayed over each burning surface. Various other techniques can also be used to stop the burning in this type of motor configuration. At the forward end of the motor 77 is located the multiple restart igniter 87 which has, for example, an outer metal case 89 and a rear nozzle area 91. Thus it is similar in configuration to a small rocket motor. Within the casing 89 are located three of the igniter elements of the invention. The details of this igniter will be explained with regard to the description of FIG. 6. A time controller 95 having individual leads 97 to each of the three igniter elements can be disposed relative to the multiple restart igniter so as to control the sequence seen in the firing of the individual elements. Thus, when the first igniter segment 99 is ignited the gases and flame therefrom will ignite the propellant layer 81 causing it to burn. When it is desired to ignite layer 83 to the second igniter segment 101 is fired from the time controller igniting propellant segment 83. In the same manner the final layer 85 can be ignited when desired by igniter 103.

Figure 6:
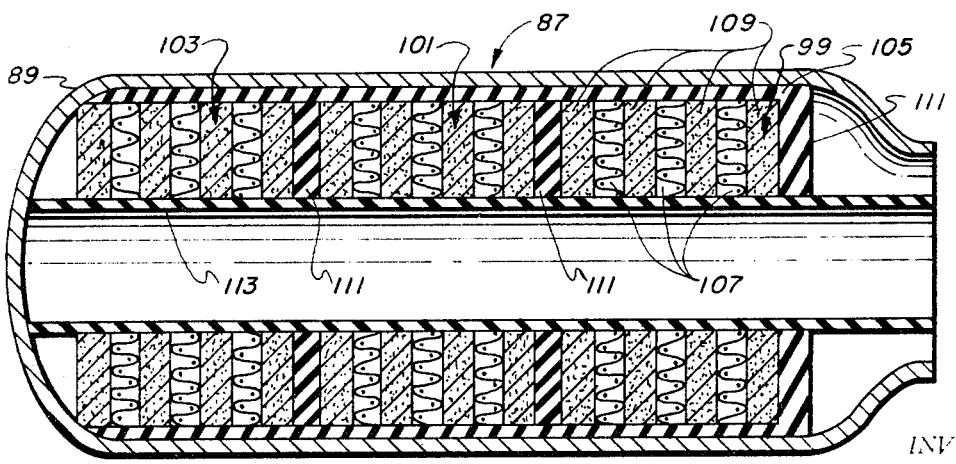
FIG. 6 is a detailed cross-sectional view of the igniter used in the motor of FIG. 5.

Referring now to FIG. 6 there is shown the details of the igniter utilizing the motor of FIG. 5. As explained with regard to FIG. 5, the igniter is comprised of, for this example, three segments, 99, 101 and 103, respectively. It should be apparent that the number of igniter segments could be greatly increased as desired to account for a motor that would have several stop-restart cycles. With reference particularly to segment 99, which is the same as segment 101 and 103, there is shown an outer rubbery restrictor material 105 between the case 89 and the igniter segment 99. The segment has three igniter elements 107 in the form of circular discs. The segments are comprised, as previously indicated, of the perforated sheet having an igniter cord or fuse train and pyrotechnic coating thereon. The segments are separated from each other by spacer material which could be a low density foam sheet 109. In other words, the igniter resembles a series of stacked wafer elements separated from each other by spacers. Each igniter segment, 99, 101 and 103, is separated from the other by thermal insulative flame barriers 111 which are comprised of a rubbery binder type material containing fillers similar to that used as the outer insulator 101. Additionally, the entire inner diameter is coated with restrictor material 113, which once again can be the same as the outer material 101 and the thermal barriers 111. It may be desired, for example, to fire two segments, 101 and 103, simultaneously to compensate for increasing chamber volume after section 99 had been previously fired. Additionally, it should be pointed out that each segment may be comprised of from one to several igniter elements, three being shown by way of example only.

The concepts disclosed in FIGS. 5 and 6 serve to illustrate the flexibility of the basic igniter concept of the invention. Instead of the stacked wafer idea disclosed, the igniter elements could be formed into concentric rings separated from each other by suitable spacer material and fired in a manner similar to that disclosed in FIGS. 5 and 6. Additionally, instead of the igniter being as depicted, as in FIGS. 5 and 6, as a separate enclosure at the head end of the basic motor, the same configuration could be built into the actual motor housing. This is particularly so in a situation where the igniter would be disposed as concentric rings, as previously indicated.

In the specific examples disclosed one formulation of the flexible pyrotechnic material used to coat the wire screen comprised 9.4 weight percent boron as a metal fuel, 75.5 weight percent of potassium perchlorate as the oxidizer. The binder utilized in this application was 9.4 weight percent vinyl chloride-acetate copolymer. A plasticizer used as an aid in processing was dioctyladipate, present in an amount of 5.7 weight percent. A second specific composition utilized 10 weight percent boron, 82.5 weight percent potassium perchlorate and 7.5 weight percent polyisobutylene as a plasticizer. The pyrotechnic composition broadly would be comprised of from 5–10 weight percent of a rubbery binder such as polybutadienes, thiosulfides, and polyurethanes and the like. The fuel used in the composition would generally be present in from 5–15 weight percent. The fuel is preferably of metal such as boron or ones of similar high reactivity. The metal used must be easy to ignite. Examples of other desirable fuels would include powdered zirconium, magnesium, and zirconium-nickel alloy. The balance of the composition would thus comprise an oxidizer. Virtually an conventional oxidizer could be utilized such as potassium nitrate, potassium perchlorate, ammonium perchlorate, and potassium chlorate. The pyrotechnic composition is not in itself novel.

The fuse train is used to expedite the ignitability of the pyrotechnic composition on the wire screen. It provides for almost instantaneous ignition of the igniter. Such a fuse train is described in U. S. Pat. No. 2,974,596. The patent concerns a lead azide material known as Pyrocore, manufactured by E. I. du Pont. Other types of fuse trains can be utilized such as the thermite type and the like.

It should be apparent that there is a wide range of variables in the actual construction of the devices of the invention. Among these variables it is to be pointed out that the mash of metal wire screen can vary. In the specific example shown, an eight mesh screen was utilized. However, the mesh of the screen can easily vary from 6–10 mesh with satisfactory results. With the range of wire mesh given, the wire diameter is preferably less than 0.025 inch, it is feasible the thickness of the coating of pyrotechnic material upon the screen can very considerably. Generally, it is desired to define the coating thickness in terms of loading. Thus it is contemplated that the coating is disposed upon the screen at from 1–2 grams per square inch of screen. This will produce a thickness of the coating of 0.08 to 0.12 inch. The diameter of the fuse train can vary extensively. For example, the Pyrocore utilized as disclosed has a diameter of approximately 0.05 inch.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An igniter for insertion adjacent a solid propellant grain to be ignited, said igniter comprising:
    a sheet having a plurality of apertures extending therethrough;
    a pyrotechnic coating extending over at least one side of said sheet and extending into said apertures;
    an igniter cord extending over one side of said sheet and being adjacent to and attached to said sheet, said cord containing a detonating-ignition core composition;
    means to attach said cord to said sheet;
    at least one initiator squib attached to an end of said cord to initiate said core composition, said core composition upon ignition producing hot particles adapted to penetrate the appertures of said sheet to ignite said pyrotechnic coating; and
    means to conduct an electrical signal into said squib to ignite said squib.

2. The invention as set forth in claim 1 further comprising means attached to the peripheral edges of said sheet to mount said igniter on an end of a propellant grain.

3. The invention as set forth in claim 1 further comprising a flame barrier sealing said igniter cord against said sheet and means for rupturing said barrier simultaneously with ignition of said core composition.

4. The invention as set forth in claim 1 in which said sheet is a circular metal disc with square perforations forming said apertures.

5. The invention as set forth in claim 1 in which said pyrotechnic coating comprises a flexible solid mass of boron and perchlorate oxidizer particles in a rubbery fuel binder.

6. The invention as set forth in claim 2 in which said sheet is in a cylindrical form and said pyratechnic coating is on the exterior surface of said sheet,
    said mounting means, said squib means and said cord being mounted on the inner surface of said sheet within the cylinder formed by said sheet,
    whereby said igniter may be inserted within a central aperture of a propellant grain and ignite grain surfaces on the inner periphery of the grain.

7. The invention as set forth in claim 1 in which a series of said igniters are provided in stacked relationship, each igniter being separated from the other by a flame barrier to prevent ignition of an unfired igniter by a previously fired igniter.

8. The invention as set forth in claim 1 in which a series of said igniters are provided for igniting boost and sustain propellant grains mounted in a rocket motor casing and restricted from one another,
    one of said igniters being in cylindrical form and mounted on the inner surface of an aperture in said boost grain and
    another of said igniters being in disc-like form and mounted on an end portion of said sustain grain,
    whereby each of said grains may be ignited by separate actuation of each of said igniters.

* * * * *